US012515308B2

(12) United States Patent
Terminella, Jr.

(10) Patent No.: US 12,515,308 B2
(45) Date of Patent: Jan. 6, 2026

(54) COMPOSITE WORK SURFACE

(71) Applicant: Snap-on Incorporated, Kenosha, WI (US)

(72) Inventor: Thomas A. Terminella, Jr., Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/226,766

(22) Filed: Jul. 26, 2023

(65) Prior Publication Data

US 2024/0042592 A1 Feb. 8, 2024

Related U.S. Application Data

(60) Provisional application No. 63/395,650, filed on Aug. 5, 2022.

(51) Int. Cl.
*B25H 1/12* (2006.01)
*A47B 96/18* (2006.01)
(Continued)

(52) U.S. Cl.
CPC ............... *B25H 1/12* (2013.01); *A47B 96/18* (2013.01); *A47B 96/206* (2013.01); *B25H 3/028* (2013.01)

(58) Field of Classification Search
CPC ... B25H 1/02; B25H 1/04; B25H 1/12; B25H 3/028; A47B 96/18; A47B 96/206; A47B 13/08; A47B 2200/0001
See application file for complete search history.

(56) References Cited

U.S. PATENT DOCUMENTS

| | | |
|---|---|---|
| 3,687,092 A | 8/1972 | Manning |
| 4,168,669 A | 9/1979 | Arnoff |

(Continued)

FOREIGN PATENT DOCUMENTS

| | | |
|---|---|---|
| CN | 107363209 A * | 11/2017 |
| CN | 114367948 A * | 4/2022 |

(Continued)

OTHER PUBLICATIONS

"40" 3 Drawer Workstation Cart | Snap-on Product Recorded Web Video [online], Snap-on Tools, Mar. 3, 2021, https://www.youtube.com/watch?v=eahM7yVmpcl, Available from: https://shop.snapon.com/product/KRSC4130-Series-Three-Drawer-Workstation-Cart-(40%22)/40%22-Three-Drawer-Workstation-Cart-(Red)/KRSC4130PBO [Accessed Dec. 18, 2023].

(Continued)

*Primary Examiner* — Andrew Roersma
(74) *Attorney, Agent, or Firm* — McDonnell Boehnen Hulbert & Berghoff LLP

(57) ABSTRACT

A tool storage unit includes a housing configured to store a tool and a top surface coupled to the housing. The top surface is a composite that includes an upper face and a lower face. The upper face is configured to be a work surface. The upper face includes a surface texture element integrally formed in the top surface. The upper face includes a raised portion along a perimeter. The lower face includes a plurality of ribs integrally formed with the lower face and protruding in a direction opposite the upper face. The plurality of ribs are spaced to form a cavity. The lower face includes a plurality of integrally formed bosses. At least one of the bosses is an attachment point for coupling to the housing.

20 Claims, 15 Drawing Sheets

(51) Int. Cl.
*A47B 96/20* (2006.01)
*B25H 3/02* (2006.01)

(56) References Cited

U.S. PATENT DOCUMENTS

| | | | | |
|---|---|---|---|---|
| 6,012,787 | A | 1/2000 | Jennings et al. | |
| 6,318,713 | B1 | 11/2001 | Levi | |
| 6,332,554 | B1 | 12/2001 | McCarthy | |
| 6,976,744 | B2 | 12/2005 | Hay et al. | |
| 6,991,694 | B2 | 1/2006 | Roehr | |
| 7,790,784 | B2 | 9/2010 | Nasr et al. | |
| 9,004,403 | B2 | 4/2015 | Boomgaarden et al. | |
| 9,180,627 | B2 | 11/2015 | Masini | |
| 9,260,063 | B2 | 2/2016 | Zaiser et al. | |
| 9,884,438 | B2 | 2/2018 | Gupta et al. | |
| 10,265,890 | B2 | 4/2019 | Burke et al. | |
| 10,358,285 | B2 | 7/2019 | Burke et al. | |
| 11,047,566 | B2 * | 6/2021 | Doerflinger | F21V 23/0471 |
| 11,235,817 | B2 | 2/2022 | Higgins et al. | |
| 11,312,090 | B2 | 4/2022 | Satoshi et al. | |
| 2005/0087908 | A1 | 4/2005 | Nasr et al. | |
| 2006/0197257 | A1 | 9/2006 | Burt et al. | |
| 2008/0078310 | A1 * | 4/2008 | VanNimwegen | A47B 3/0916 108/127 |
| 2008/0278046 | A1 * | 11/2008 | Scheffy | B25H 3/02 312/215 |
| 2009/0056257 | A1 | 3/2009 | Mollinger et al. | |
| 2009/0062413 | A1 | 3/2009 | Adur et al. | |
| 2010/0139531 | A1 | 6/2010 | Valeriote | |
| 2011/0185662 | A1 | 8/2011 | Mollinger et al. | |
| 2018/0162021 | A1 | 6/2018 | Gupta et al. | |
| 2019/0118417 | A1 | 4/2019 | Mainka et al. | |
| 2019/0176375 | A1 | 6/2019 | Burke et al. | |
| 2020/0114590 | A1 | 4/2020 | Ikeda et al. | |
| 2020/0191331 | A1 * | 6/2020 | Leng | B65D 43/22 |
| 2021/0002436 | A1 * | 1/2021 | Shinoura | B29C 70/14 |
| 2021/0331429 | A1 | 10/2021 | Ikeda et al. | |
| 2021/0402905 | A1 | 12/2021 | Bruni et al. | |
| 2022/0097747 | A1 * | 3/2022 | Beckwith | B25H 3/028 |
| 2022/0134534 | A1 * | 5/2022 | Groves | B25H 1/0042 173/30 |
| 2022/0168974 | A1 * | 6/2022 | Kaji | C08J 5/243 |
| 2022/0402114 | A1 * | 12/2022 | Tilly | A47B 88/423 |

FOREIGN PATENT DOCUMENTS

| | | | | |
|---|---|---|---|---|
| EP | 01114582 | A2 | 8/1984 | |
| EP | 4032955 | A1 | 7/2022 | |
| KR | 20130006013 | U * | 10/2013 | A47B 13/08 |
| KR | 200475179 | Y1 * | 11/2014 | A47B 13/086 |
| WO | 2011135559 | A1 | 11/2011 | |
| WO | WO-2016039701 | A1 * | 3/2016 | A47B 96/18 |

OTHER PUBLICATIONS

Search Report prepared by the Great Britain Intellectual Property Office in application No. GB2311789.8 dated Dec. 20, 2023.

Assembly, Sheet Molded (SMC) Cover, https://www.hubbell.com/hubbellpowersystems/en/Products/Power-Utilities/Enclosures---Below-Ground/Boxes/Straight-Wall/Assembly-Sheet-Molded-Compound-SMC-Cover-and-HDPE-Box/p/9090502, Aug. 28, 2022.

* cited by examiner

COMPOSITE WORK SURFACE

CROSS-REFERENCE TO RELATED APPLICATION

The present application claims priority to U.S. Provisional Application No. 63/395,650, filed Aug. 5, 2022, which is hereby incorporated by reference.

BACKGROUND

Work surfaces may be fixed to a variety of objects, such as toolboxes and utility carts. Currently, work surfaces are made from one or more materials, such as wood, metal, metal covered wood, and plastic. However, several drawbacks exist for the materials currently used to manufacture work surfaces. Work surfaces made from wood and metal coated wood are heavy, often are made from multiple pieces of wood requiring time consuming processing steps, and geometrically constrained to simple geometries (e.g., generally planar). Further, wood work surfaces may be susceptible to damage, such as scratching, staining, warping, and burning. Metal work surfaces are similarly heavy and geometrically constrained. Additionally, metal work surfaces may be susceptible to corrosion (e.g., rust) and scratching. Coatings, such as paint, may be applied to metal work surfaces to reduce corrosive effects; however, the coatings may incur scratching during use which may expose the underlying metal. Work surfaces made from plastic are typically lighter weight than wood and metal based work surfaces, and may provide more geometric variance. However, plastic work surfaces are prone to scratching, as well as warping or cracking from heavy objects being placed on top. Plastic work surfaces are also susceptible to damage from heat. For example, a hot object (e.g., a heat gun) placed on the plastic work surface may cause melting or other damage to occur.

OVERVIEW

In a first implementation, a tool storage unit is provided. The tool storage unit includes a housing configured to store a tool. The tool storage unit also includes a top surface coupled to the housing. The top surface is a composite. The top surface includes an upper face and a lower face disposed opposite the upper face. The upper face is configured to be a work surface. The upper face includes a surface texture element. The surface texture element is integrally formed in the top surface and lies substantially planar over the upper face. The upper face further includes a raised portion along a perimeter of the upper face. The lower face includes a plurality of ribs that are integrally formed with the lower face and protrude in a direction opposite the upper face. The plurality of ribs are configured to facilitate the transfer of loading from loads placed on the upper face. The plurality of ribs are spaced at a distance so as to form a cavity. The lower face also includes a plurality of integrally formed bosses. At least one of the bosses is configured to be an attachment point for coupling to the housing.

In an embodiment of the tool storage unit, the upper face includes a substantially planar smooth surface being integrally formed in the top surface.

In such an embodiment, the substantially planar smooth surface has an area of at least 60 square inches.

In an embodiment of the tool storage unit, the composite is selected from a group comprising at least one of a sheet molding compound (SMC), a bulk molding compound (BMC), a short fiber injection (SFI), and a long fiber injection (LFI).

In an embodiment of the tool storage unit, the composite is a fiber reinforced thermoset.

In an embodiment of the tool storage unit, the top surface further comprises an illumination assembly.

In such embodiments of the tool storage unit, the illumination assembly is disposed on the lower face of the top surface.

In an embodiment of the tool storage unit, a threaded insert is disposed within at least one of the bosses.

In an embodiment of the tool storage unit, at least one of the bosses includes an integrally formed threading.

In an embodiment of the tool storage unit, the lower face further includes a second plurality of ribs integrally formed with the lower face and protruding in the direction opposite the upper face. The second plurality of ribs are aligned parallel to an edge of the work surface.

In an embodiment of the tool storage unit, the top surface is coupled to a first side of the housing and a caster is coupled to a second side of the housing opposite the first side.

In an embodiment of the tool storage unit, the surface texture element is a rough surface.

In an embodiment of the tool storage unit, the upper face includes a plurality of planar smooth surfaces integrally formed with the top surface, wherein each of the plurality of planar smooth surfaces has an area of at least 60 square inches.

In an embodiment of the tool storage unit, an entire perimeter of the upper face includes the raised portion.

In an embodiment of the tool storage unit, the top surface further includes a panel core internally disposed between the upper face and the lower face.

In a second implementation, a work surface is provided. The work surface includes a top surface. The top surface is a composite. The top surface includes an upper face and a lower face disposed opposite the upper face. The upper face is configured to be a work surface. The upper face includes a surface texture element. The surface texture element is integrally formed in the top surface and lies substantially planar over the upper face. The upper face further includes a raised portion along a perimeter of the upper face. The lower face includes a plurality of ribs that are integrally formed with the lower face and protrude in a direction opposite the upper face. The plurality of ribs are configured to facilitate the transfer of loading from loads placed on the upper face. The plurality of ribs are spaced at a distance so as to form a cavity. The lower face further includes a plurality of integrally formed bosses. At least one of the bosses is configured to be an attachment point for coupling to the housing.

In an embodiment of the work surface, the upper face includes a substantially planar smooth surface being integrally formed in the top surface.

In such an embodiment, the substantially planar smooth surface has an area of at least 60 square inches.

In an embodiment of the work surface, the composite is selected from a group comprising at least one of a sheet molding compound (SMC), a bulk molding compound (BMC), a short fiber injection (SFI), and a long fiber injection (LFI).

In an embodiment of the work surface, the composite is a fiber reinforced thermoset.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

The drawings are schematic and not necessarily to scale. In the drawings, similar symbols typically identify similar components, unless context dictates otherwise.

DETAILED DESCRIPTION

This description describes several example embodiments, at least some which relate to composite work surfaces. In example embodiments, the composite work surface may include an upper face and a lower face disposed opposite the upper face. The upper face may include integrally formed smooth portions and surface textured portions. The smooth portions may allow for writing to more easily be accomplished than on a textured surface, while the surface textured portions may provide grip and/or added durability to the work surface. The lower face may include integrally formed ribbing and bosses. The ribbing may provide structural stability to the work surface while the bosses may allow for coupling to another object. The use of composite may provide for a strong and light weight structure that may allow for complex geometries to be integrally formed on the work surface. Integrally forming complex geometries on the work surface may provide for simpler manufacturing by reducing part count and/or manufacturing time of the work surface.

In examples of the present disclosure, a tool storage unit including a top surface is disclosed. More particularly, the tool storage unit may include a housing configured to store a tool and a top surface coupled to the housing. The top surface may be a composite. The top surface may include an upper face and a lower face disposed opposite the upper face. The upper face may be configured to be a work surface. The upper face may include a surface texture element. The surface texture element may be integrally formed in the top surface and lie substantially planar over the upper face. The upper face may include a substantially planar smooth surface that is integrally formed in the top surface and has an area of at least 60 square inches. The upper face may include a raised portion along a perimeter of the upper face. The lower face may include a plurality of ribs that are integrally formed with the lower face and protrude in a direction opposite the upper face. The plurality of ribs may be aligned parallel to an edge of the composite work surface. The plurality of ribs may be configured to facilitate the transfer of loading from loads placed on the upper face. The plurality of ribs may be spaced at a distance so as to form a cavity. The lower face may include a plurality of integrally formed bosses. At least one of the bosses may be configured to be an attachment point for coupling to the housing. Thus, the top surface may provide for a work surface that may be coupled to the tool storage unit, the work surface having smooth and textured portions and integrally formed complex geometries.

Figure 1:
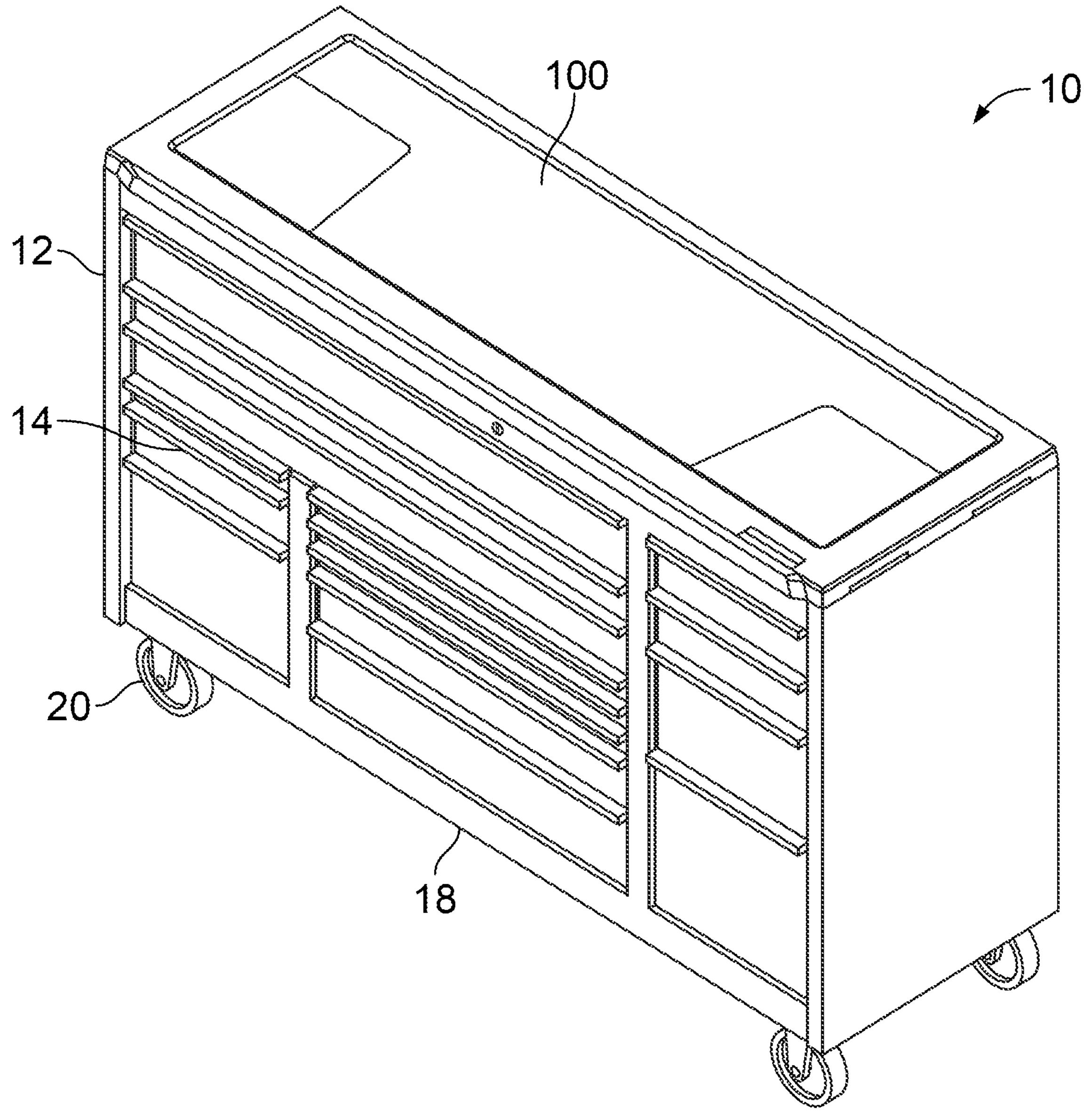
FIG. 1 illustrates a tool storage unit including a work surface, according to an example embodiment.

FIG. 1 illustrates a tool storage unit 10 including a work surface 100, according to an example embodiment. The tool storage unit 10 includes a housing 12 that may include one or more parts of the tool storage unit 10 (e.g., drawers, cabinets), various enclosures, among other examples. The tool storage unit 10 may be part of a larger storage device or be a standalone unit. A user may open a drawer 14 or a door of the housing 12. The housing 12 may be used to store various tools and equipment.

Various components may be coupled to the housing 12 of the tool storage unit 10. For example, the tool storage unit 10 may include a caster wheel 20 coupled to an underside 18 of the housing 12. The underside 18 may be located opposite of the work surface 100. The caster wheel 20 may allow for the tool storage unit 10 to be moved to a desired location. As shown, the work surface 100 is coupled to the housing 12 of the tool storage unit 10. The work surface 100 may allow for placement of various objects, such as tools, equipment, papers, and/or books. The work surface 100 may allow for a user to work on a desired work-piece while still being able to access the tool storage unit 10.

Figure 2A:
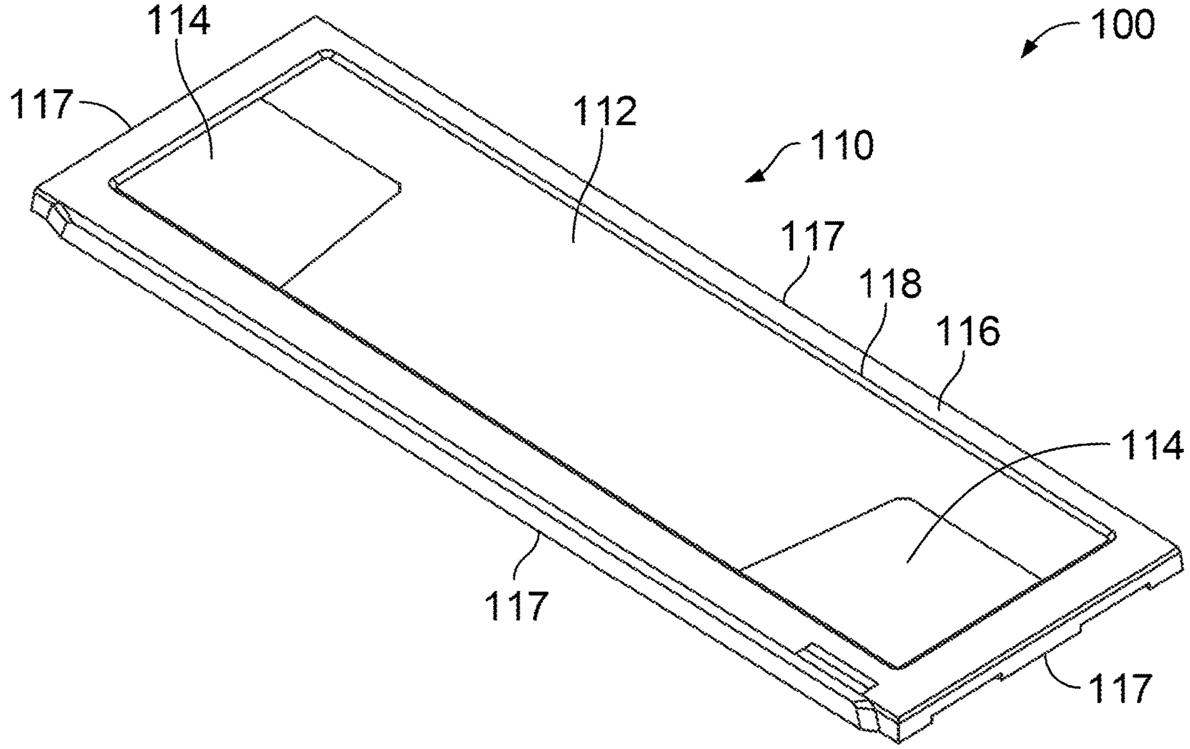
FIGS. 2A and 2B illustrate perspective views of an upper face and a lower face of a work surface, according to an example embodiment.

FIG. 2A illustrates a perspective view of an upper face 110 of the work surface 100, according to an example embodiment. As shown, the upper face 110 of the work surface 100 includes a textured portion 112, a smooth portion 114, and a raised portion 116 having an inwardly facing side 118. The work surface 100 may be configured to couple to another object, such as to the housing 12 of the tool storage unit 10.

As illustrated, the raised portion 116 of the work surface 100 is situated along a perimeter (e.g., an outer perimeter) of the upper face 110. In the example shown, the raised portion 116 is situated, unbroken, along the entire perimeter of the upper face 110. However, in other examples the raised portion 116 may be situated along a portion, or portions, of the perimeter such that one or more portions of the perimeter may not have the raised portion 116 while other portions of the perimeter may have the raised portion 116. In some examples, the raised portion 116 may be situated away from the perimeter.

The raised portion 116 may extend a distance outwardly on the upper face 110. For example, when the work surface 100 is coupled to the tool storage unit 10 the raised portion 116 may extend in a direction opposite the underside 18.

While the raised portion 116 shown in FIG. 2A extends outwardly on the upper face 110 at a constant distance along the perimeter, in other examples the raised portion 116 may vary in the distance that it extends outwardly on the upper face 110. For instance, one or more sections of the raised portion 116 may extend outwardly on the upper face 110 at a distance greater than another section of the raised portion 116 extends.

In some examples, a width of the raised portion 116 may be defined by an edge 117 of the upper face 110 and the inwardly facing side 118. The width of the raised portion 116 may be constant or non-constant along the perimeter of the upper face 110. For example, a width of the raised portion 116 between a first edge and a first inwardly facing side may be different from a width of the raised portion 116 between a second edge and a second inwardly facing side. The inwardly facing side 118 may define a contour change on the upper work surface 110 between the raised portion 116 and the textured portion 112 and/or the smooth portion 114. In some examples, the inwardly facing side 118 may form a 90 degree angle (e.g., a right angle) with the textured portion 112 and/or the smooth portion 114, while in other examples the inwardly facing side 118 may be curved or at an angle less than 90 degrees. For instance, the inwardly facing side 118 may be beveled, chamfered, and/or filleted. The inwardly facing side 118, along with the raised portion 116, may act as a retaining mechanism for objects placed on the upper face 110 which may serve to prevent the objects from rolling off of the work surface 100. For instance, a fastener or writing implement (e.g., pencil) placed on the upper face 110 may roll about the upper face 110 and come into contact with the inwardly facing side 118 and/or the raised portion 116. The angle of the inwardly facing side 118 may be such that the object is unable to roll over the inwardly facing side 118. Thus, the inwardly facing side 118 along with the raised portion 116 may aid in retaining objects placed on the upper face 110.

The upper face 110 includes the smooth portion 114. The smooth portion 114 may have an even and/or regular surface consistency that is substantially free from perceptible projections, lumps, and/or indentations. The smooth portion 114 may be integrally formed on the upper face 110, such as being formed during a molding process. The smooth portion 114 may be disposed at one or more locations on the upper face 110. For instance, FIG. 2A shows the work surface 100 includes two smooth portions 114. However, in other examples the work surface may include only one smooth portion 114 or more than two smooth portions 114. With respect to the raised portion 116, the smooth portion 114 may be recessed on the upper face 110, situated inward of the inwardly facing side 118. In some examples, the smooth portion 114 may have a minimum unbroken area of 60 square inches. Within examples, the area of the smooth portion 114 may be sufficient to allow for writing on a standard piece of paper (e.g., 8.5 inches by 11 inches). Surface texturing may hinder and/or affect the ease and cleanliness of writing. Thus, the smooth portion 114 may allow for a user to write on a piece of paper without the writing being potentially affected by underlying texturing on the surface.

The upper face 110 includes the textured portion 112. The textured portion 112 may have one or more surface texture elements that give the textured portion 112 a non-uniform surface consistency. In some examples, the one or more surface texture elements of the textured portion 112 may be patterned (e.g., tread plate or cross-hatched), while in other examples the one or more surface texture elements may have no discernable pattern (e.g., randomly arranged protrusions). Thus, within examples the surface texture element may be a rough surface.

The one or more surface texture elements of the textured portion 112 may be integrally formed on the upper face 110, such as being formed during a molding process. The textured portion 112 may be disposed at one or more locations on the upper face 110. For instance, FIG. 2A shows a single textured portion 112 defined by the raised portion 116 and the two smooth portions 114. However, in other examples more than one textured portion 112 may be present. With respect to the raised portion 116, the textured portion 112 may be recessed on the upper face 110, and/or situated inward of the inwardly facing side 118. In some examples, the textured portion 112 may have a minimum unbroken area of 60 square inches.

Within examples, the textured portion 112 may account for between 30 and 40 percent of the upper face 110, between 40 and 50 percent of the upper face 110, between 50 and 60 percent of the upper face 110, between 60 and 70 percent of the upper face 110, or greater than 70 percent of the upper face 110. Texturing selected for the textured portion 112 may advantageously provide surface grip for objects placed on the work surface 100, which may prevent said placed objects from sliding around the upper face 110. The textured portion 112 may also increase toughness of the upper face 110 by resisting scratching and/or abrasion during use. The greater the percentage of the textured portion on the upper face 110 increases the surface area that may resist scratching and/or abrasion, however less smooth surface will be available for writing or other uses.

In some examples, the upper face 110 may include one or more apertures. The one or more apertures may be integrally formed in the upper face 110. Within examples, the apertures may serve as anchor points for attaching various objects. For instance, the apertures may be configured to allow for attachment of tools. This may allow for stabilization of certain tools during use. In some examples, the upper face 110 may include an integrally formed recessed section, such as a channel and/or trough. The channel and/or trough may allow for objects, such as fastening devices, to be sequestered in a designated location on the upper face 110. Sequestering certain objects in a designated location may mitigate said objects from rolling loosely about on the upper face 110, as well as provide a more organized way to arrange objects on the work surface 100. Within examples, the work surface 100 may include an electrical outlet that may allow for objects, such as electrically powered tools, to be powered while on, and/or in proximity to, the work surface 100. This may reduce the need for extension cords that may be situated along a floor, which may pose safety hazards to personnel walking about a workshop.

Figure 2B:
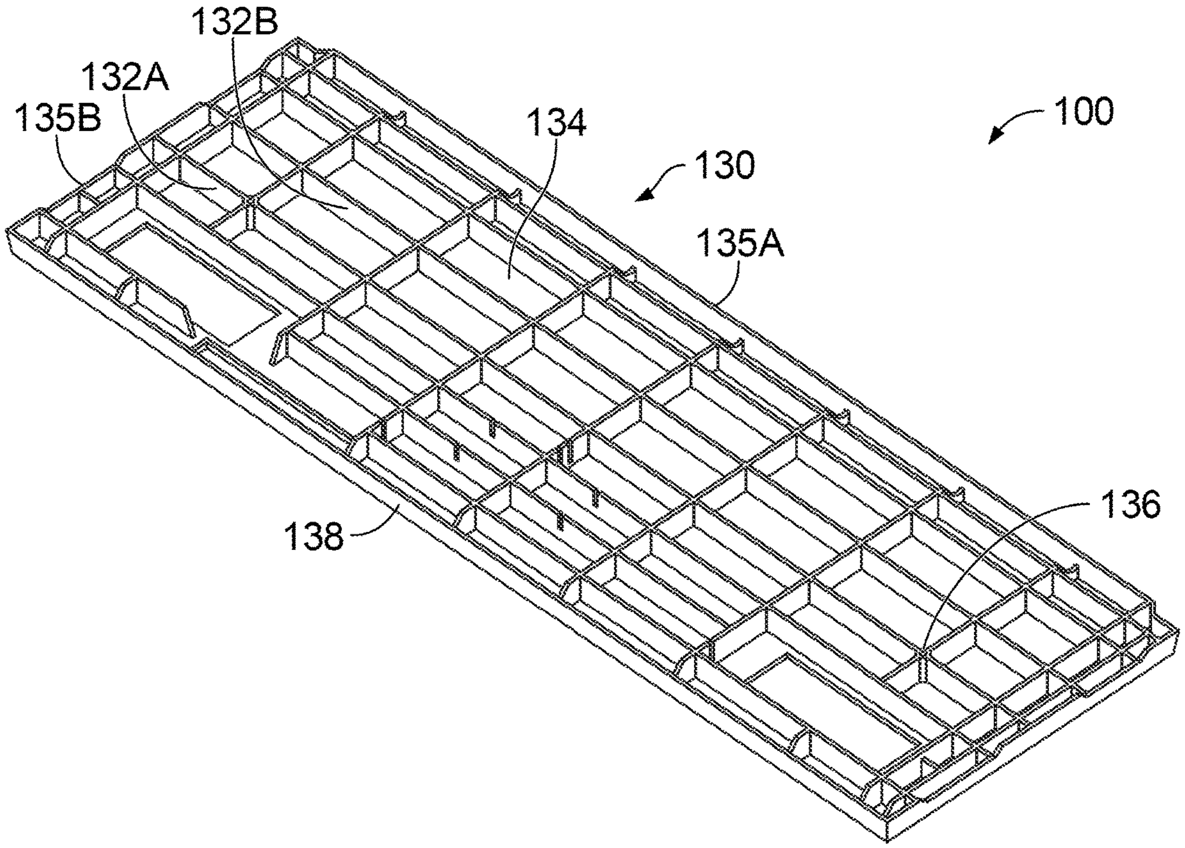

FIG. 2B illustrates the lower face 130 of the work surface 100, according to an example embodiment. The lower face 130 includes one or more bosses 136, a lip 138 situated along an outer perimeter of the lower face 130, a first plurality of ribbing 132A, a second plurality of ribbing 132B, and one or more cavities 134 defined by the first and second set of ribbing 132A and 132B. The bosses 136, the lip 138, and the plurality of ribbing 132A and 132B may be integrally formed with the lower face 130.

As shown, the first plurality of ribbing 132A spans a length of the lower face 130, terminating at opposite facing sections of the lip 138. The first plurality of ribbing 132A may be aligned parallel to an edge of the lower face 130, such as parallel to a first edge 135A. The first plurality of ribbing 132A may protrude outwardly from the lower face

130 in a direction opposite of the upper face 110. Similarly, the second plurality of ribbing 132B may protrude outwardly from the lower face 130 in a direction opposite the upper face 110. The second plurality of ribbing 132B may be aligned parallel to an edge of the lower face 130 that is perpendicular to the first edge 135A, such as parallel to a second edge 135B. The second plurality of ribbing 132B may span a width of the lower face 130, terminating at opposite facing sections of the lip 138. As shown, the first and second plurality of ribbing 132A and 132B intersect one another at various points on the lower face 130. One or more cavities 134 may be defined by the intersection of the first and second plurality of ribbing 132A and 132B. In some examples, however, one or more cavities 134 may be defined by the intersection of the first and second plurality of ribbing 132A and 132B and the lip 138. While the first and second plurality of ribbing 132A and 132B are shown to intersect at a 90 degree angle (e.g., perpendicular to one another), in some examples the first and second plurality of ribbing 132A and 132B may intersect at another angle. This is discussed further with respect to FIGS. 6A-8B.

The first and second plurality of ribbing 132A and 132B may serve to transfer loading between one another, the lip 138, and the work surface 100 generally. Thus, the first and second plurality of ribbing 132A and 132B may provide structural strength to the upper face 110, mitigating the occurrence of buckling and/or warping of the work surface 100 during use, while reducing the overall weight of the work surface 100 compared to a structure having a solid thickness.

Within examples, the location, number of ribs, and/or angle of orientation of the ribs may be determined based on a desired mechanical property of the work surface 100. For instance, it may be determined that only the first plurality of ribbing 132A or the second plurality of ribbing 132B may be desired, in which case the one or more cavities 134 may be defined by the respective plurality of ribbing and the lip 138. In some examples, the first and/or second plurality of ribbing 132A and 132B may be substantially uniform along a length, while in other examples a thickness and/or height may vary along a length. In some examples, the first and/or second plurality of ribbing 132A and 132B may have integrally formed cut-outs (e.g., material absent from a respective cross-section). The cut-outs may allow for retaining or acceptance of objects, such as a recessed portion and/or aperture in a rib that receives an electric cord.

As shown in FIG. 2B the lower face 130 includes the one or more bosses 136. The one or more bosses 136 may be integrally formed on the lower face 130 and protrude outwardly in a direction opposite of the upper face 110. In some examples, the one or more bosses 136 may each define a cavity. The cavity of each of the one or more bosses 136 may share a center point or midpoint with the respective boss. In some examples, each of the one or more bosses 136 may be configured to receive an insert, such as a fastening device (e.g., a rod or a bolt). For example, each of the one or more bosses 136 may include an integrally formed threaded section. Within examples, the integrally formed threaded section may be formed during manufacture using a threading tap. However, in other examples each of the one or more bosses 136 may be configured to receive a threaded insert to facilitate coupling with another object, such as the tool storage unit 10.

As shown, the one or more bosses 136 may be located where the first and second plurality of ribbing 132A and 132B intersect. Placement of the one or more bosses 136 at the intersection of ribbing (e.g., 132A and 132B) may provide rigidity to the one or more bosses 136, when the work surface 100 is coupled to the tool storage unit 10, which may reduce the likelihood of cracking at the one or more bosses 136. However, in other examples the one or more bosses 136 may not be located at intersecting ribbing. For example, the one or more bosses 136 may be unsupported by additional structure (e.g., freestanding) on the lower face 130. In some examples, the location of the one or more bosses 136 may be based on a configuration of a mating structure, such as attachment point locations on the tool storage unit 10. Integrally forming the one or more bosses 136 on the lower face 130 may provide a simple and effective way to couple the work surface 100 to another object while reducing a number of required parts for assembly.

As illustrated, the lip 138 of the work surface 100 is situated along a perimeter (e.g., an outer perimeter) of the lower face 130. In the example shown, the lip 138 is situated, unbroken, along the entire perimeter of the lower face 130. However, in other examples the lip 138 may be situated along a portion, or portions, of the perimeter such that one or more portions of the perimeter may not have the lip 138 while other portions of the perimeter may have the lip 138. The lip 138 may extend a distance outwardly from the lower face 130 in a direction opposite the upper face 110. For example, when the work surface 100 is coupled to the tool storage unit 10 the lip 138 may extend in a direction toward the underside 18. While the lip 138 may extend outwardly from the lower face 130 at a constant distance in some examples, in other examples the lip 138 may vary in the distance that it extends outwardly from the lower face 130. For instance, one or more sections of the lip 138 may extend outwardly from the lower face 130 at a distance greater than another section of the lip 138 extends. In some examples, when the work surface 100 is coupled to the tool storage unit 10 a portion of the housing 12 may be partially obscured by the lip 138. For example, the lower face 130 may be configured to receive a portion of the housing 12 such that the lip 138 may extend around the portion of the housing 12. This may allow the work surface 100 to lie flush on the tool storage unit 10, as well as provide a more secure coupling between the work surface 100 and the housing 12.

In some examples, the work surface 100 is made from a composite material. For example, the work surface may be a thermoset composite material including a thermoset resin (e.g., epoxy, polyester, and polyurethane) and a fiber (e.g., glass, aramid, and carbon). For example, the work surface 100 may be made from a fiber reinforced thermoset composite, such as a polyester fiber disposed in an epoxy resin. Within examples, the fiber may be woven, unidirectional, or chopped (e.g., long and/or short). A chopped fiber, such as a short fiber, may allow for more intricate geometric features to be formed in the work surface 100. Using the composite material to manufacture the work surface 100 may allow for the work surface 100 to be strong and lightweight while also minimizing the occurrence of cracking and/or warping over time due to repeated use. The composite material work surface may also provide resistance to damage from ultraviolet light exposure, corrosion resistance to chemicals that may come into contact with the work surface 100, and/or heat resistance from hot objects that may be placed on the upper face 110.

In some examples, the work surface 100 may be the composite material made from a sheet molding compound (SMC), a bulk molding compound (BMC), a short fiber injection (SFI), or a long fiber injection (LFI) material delivery system. The method of manufacture may be determined by the desired properties of the work surface 100. For instance, manufacturing the work surface 100 using the SMC may produce a mechanically stronger structure than using the BMC, while manufacturing the work surface 100 using the BMC may provide more flexibility to the structure. The SMC, BMC, SFI, or LFI may be placed into a mold having the features desired to be formed in the work surface 100. For example, the mold may be a negative mold of desired dimensions (e.g., raised and/or recessed) and surface features (e.g., smooth and/or textured) of the work surface 100. Pressure and/or heat may be applied to the SMC, BMC, SFI, or LFI in the mold such that the composite material assumes the open space within the mold, forming the desired dimensions and features of the work surface 100. Manufacturing the work surface 100 from the composite material made from SMC, BMC, SFI, or LFI may allow complex geometric features to be integrally formed on the work surface 100.

In some examples the raised portion 116, the inwardly facing side 118, the textured portion 112, the smooth portion 114, and/or any other features of the upper face 110 may be integrally formed in the work surface 100 through the molding process. Similarly, in some examples the plurality of ribbing 132A and 132B, the lip 138, the one or more bosses 136, and/or any other features of the lower face 130 may be integrally formed in the work surface 100 through the molding process. Thus, within examples the work surface may be a single piece construction having one or more integrally molded components. Manufacturing the work surface 100 to be a single piece construction having integrally molded components may reduce the time and/or costs associated with producing the work surface 100, which may allow for a higher production rate.

In some examples, the work surface 100 may include a panel core internally disposed between the upper and lower face 110 and 130, respectively. For example, the panel core may be a foam core or a honeycomb-style core. During manufacturing of the work surface 100, the panel core may be inserted between the upper and lower faces 110 and 130 and coupled using adhesives and/or heat. The panel core may provide a light weight way to add thickness and/or rigidity to the work surface 100. In some examples, the panel core may further facilitate coupling to mating structure, such as serving as an anchoring point for a fastener. An example panel core is further illustrated and discussed with respect to FIGS. 9A and 9B below.

Figure 3:
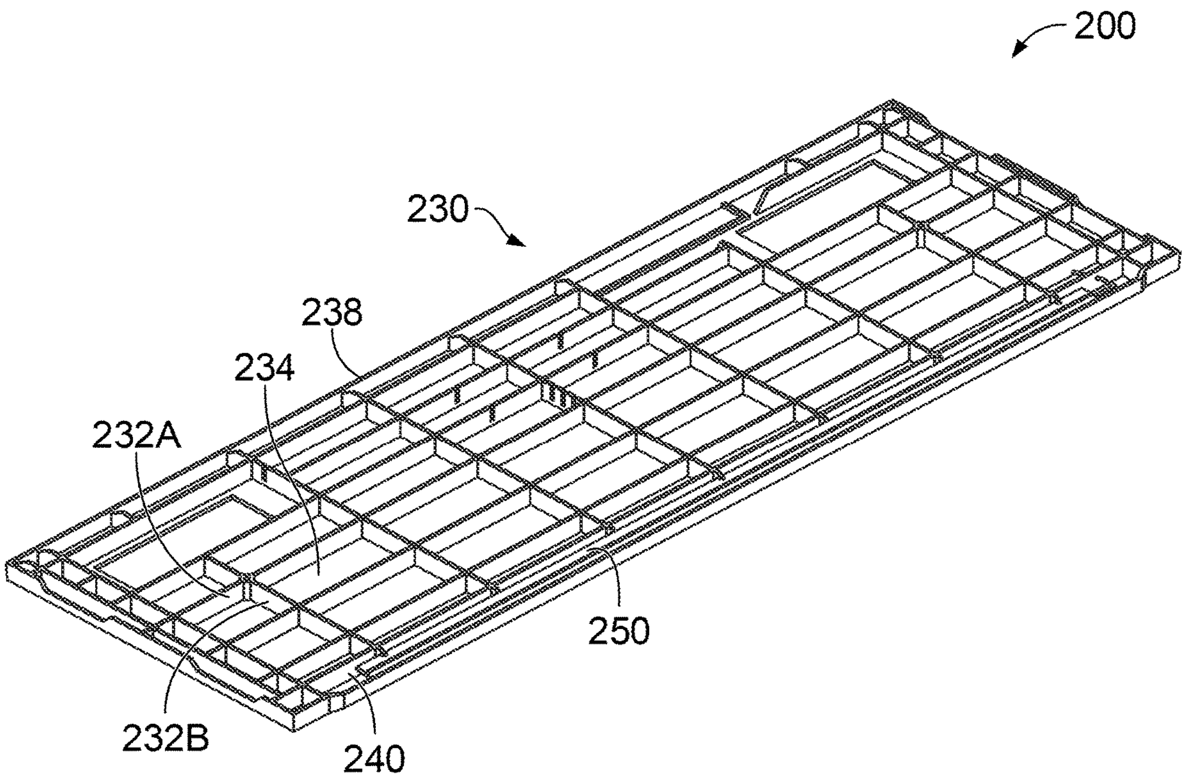
FIG. 3 illustrates a perspective view of a lower face of a work surface including an illumination assembly, according to an example embodiment.

FIG. 3 illustrates a perspective view of a lower face 230 of a work surface 200 including an illumination assembly 250, according to an example embodiment. The lower face 230 includes a plurality of ribbing 232A and 232B defining one or more cavities 234, a lip 238 disposed along a perimeter of the lower face 230, and the illumination assembly housed within a receiving portion 240. The work surface 200 may have the same or similar features and/or functions as described with respect to the work surface 100. Thus, the aspects described with respect to the work surface 100 may be equally applicable to the work surface 200.

As shown, the lower face 230 includes the illumination assembly 250 housed within the receiving portion 240. In some examples, the receiving portion 240 may allow for the illumination assembly 250 to be completely recessed within the work surface 200 such that the illumination assembly 250 may sit flush with, or not extend beyond, an edge of the work surface 200. The receiving portion 240 may be an integrally molded component on the lower face 230 that may aid in retaining the illumination assembly 250 during and/or after installation. For example, the receiving portion 240 may be a cavity defined by one or more protrusions (e.g., walls, edges, and/or ribs) extending orthogonal to, and outwardly from, the lower face 230. In some examples, a dimension of the receiving portion 240, defined by the one or more protrusions, may be based on a dimension (e.g., a width and/or a length) of the illumination assembly 250. Within examples, at least one of the one or more protrusions may define an aperture. The aperture may be configured to facilitate coupling with the illumination assembly 250, such as by receiving a fastening device.

In some examples, the receiving portion 240 may include an integrally molded bracket and/or tab. The bracket and/or tab may be configured to facilitate coupling with of the illumination assembly 250 with the lower face 230. For example, the bracket and/or tab may include an aperture capable of receiving a fastening device that may couple the lower face 230 to the illumination assembly 250.

However, in other examples the bracket and/or tab may be sufficiently flexible to allow deflection (e.g., plastic deformation) during installation of the illumination assembly 250. For example, the bracket and/or tab may be deflected in a first direction to allow the illumination assembly 250 to be placed within the receiving portion 240. After the illumination assembly 250 is placed within the receiving portion 240 the bracket and/or tab may be released which may allow the bracket and/or tab to spring back to an un-deflected position securing the illumination assembly 250 within the receiving portion 240. Thus, within examples the bracket and/or tab may function as a spring to allow receiving and securing of the illumination assembly 250.

In some examples the illumination assembly 250 may be positioned along a side of the lower face 230. For instance, when the work surface 100 is installed on the tool storage unit 10 the illumination assembly may be on the same side as the drawer 14. In examples where the illumination assembly 250 is on the same side as the drawer 14, one or more lights on the illumination assembly 250 may be oriented in a direction towards the underside 18. This may allow for illumination of the drawer 14 when opened for easier viewing of contents stored within the drawer 14. However, in some embodiments one or more lights of the illumination assembly 250 may point in a different direction, such as outwardly from the work surface 100. This may provide illumination to a work space that the user may be working in.

Figure 4:
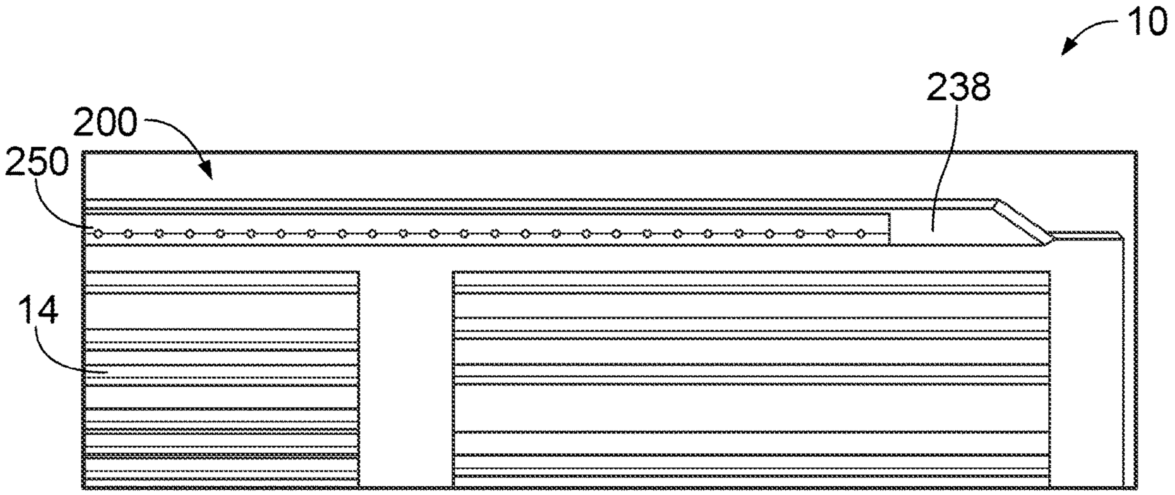
FIG. 4 illustrates a front view of a tool storage unit including a work surface having an illumination assembly, according to an example embodiment.

FIG. 4 illustrates a front view of the tool storage unit 10 including the work surface 200 having the illumination assembly 250, according to an example embodiment. As shown, the illumination assembly 250 is situated on the same side of the work surface 200 as the drawer 14. However, in other examples the illumination assembly 250 may be located on a different side of the work surface 200 than the side aligned with the drawer 14. Within examples, illumination assembly 250 may be configured to automatically illuminate when the drawer 14 is opened. For example, opening of the drawer 14 may actuate a switch that causes illumination of the illumination assembly 250. Similarly, closing of the drawer 14 may actuate the switch causing the illumination assembly 250 to shut off. In some examples, the lip 238 may not extend along a portion of the perimeter of the lower face 230 that includes the illumination assembly 250, such as not extending along the receiving portion 240. This may allow light from the illumination assembly 250 to be projected in a desired direction, such as downward and/or outward, without interference from the lip 138.

Figure 5A:
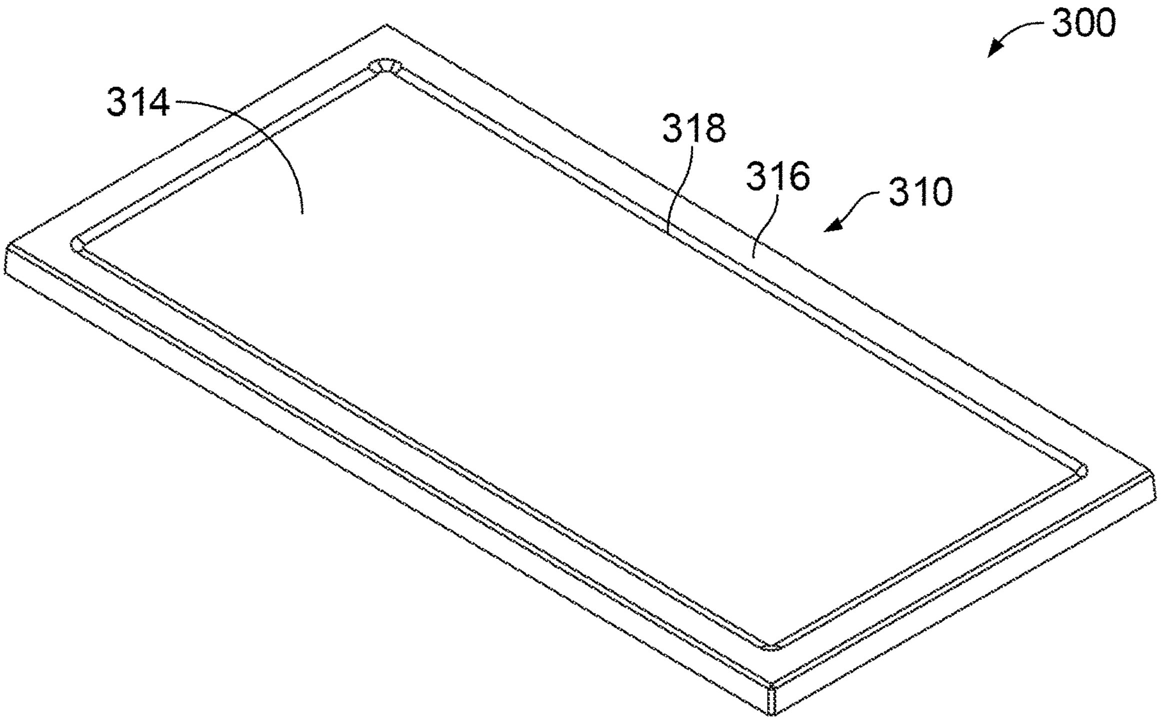
FIGS. 5A and 5B illustrate perspective views of an upper face and a lower face of another work surface, according to an example embodiment.

FIG. 5A illustrates a perspective view of an upper face 310 of another work surface 300, according to an example embodiment. As shown, the upper face 310 includes a raised portion 316 having an inwardly facing side 318 and a recessed portion 314. The raised portion 316 along with the inwardly facing side 318 extend along a perimeter of the upper face 310 and define the recessed portion 314. However, in some examples, the raised portion 316 and the inwardly facing side 318 may only extend along a portion of the perimeter, such as less than all sides of the perimeter. The work surface 300 may have the same or similar features and/or functions as described with respect to the work surface 100 and/or 200. Thus, the aspects described with respect to the work surface 100 and/or 200 may be equally applicable to the work surface 300.

While FIG. 5A shows the recessed portion 314 having a substantially uniform surface composition, in some examples, the recessed portion 314 may include one or more integrally molded surface texturing elements, one or more integrally molded smooth elements, or a combination of one or more surface texture elements and smooth elements. For example, the recessed portion 314 may include a rough surface texturing element.

Figure 5B:
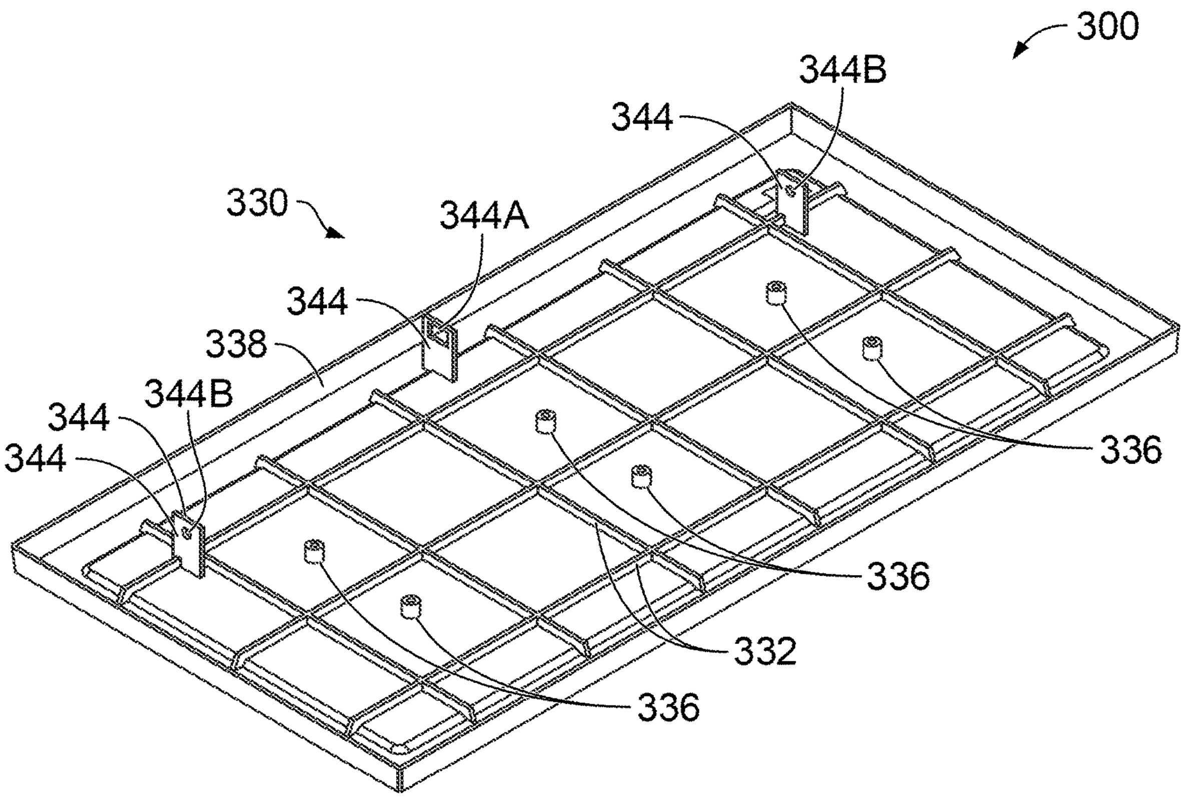

FIG. 5B illustrates a perspective view of a lower face 330 of the work surface 300, according to an example embodiment. The lower face 330 includes ribbing 332, bosses 336, a lip 338, and attachment points 344.

The attachment points 344 may be one or more integrally molded structures that protrude outwardly from the lower face 330 in a direction opposite the upper face 310. In some examples, one or more of the attachment points 344 may define an aperture, such as apertures 344A and 344B. The apertures 344A and 344B of the attachment points 344 may facilitate coupling to another object, such as the tool storage unit 10. In some examples, the attachment points 344 may be configured to allow for raising and lowering (e.g., opening and closing) of the work surface 300 when coupled to the tool storage unit 10. For example, the attachment points 344 may be coupled to a hinge or a gas spring that is coupled to the tool storage unit 10. Opening and closing of the work surface 300 may allow a user to access a compartment of the tool storage unit 10. Thus, within examples the work surface 300 may be a lid.

In examples where the work surface 300 is the lid, the ribbing 332 may not extend to the perimeter (e.g., the lip 338) of the lower face 330. Thus, the ribbing 332 may be present along a portion of the lower face 330 at a distance away from the perimeter. For example, as shown the ribbing 332 forms a rectangular grid-like pattern on the lower face 330 and a distance of separation exists between the ribbing 332 and the lip 338 disposed along the perimeter. The distance of separation between the ribbing and the lip 338 and/or the perimeter may be determined based on a dimension of mating structure, such as a dimension on the tool storage unit 10. The distance of separation between the ribbing 332 and the lip 338 may allow for coupling of the work surface 300 to another object, such as the tool storage unit 10, without being impeded by the ribbing 332. This may allow for the lower face 330 to engage (e.g., sit flush on) the tool storage unit 10.

FIGS. 6A-8B illustrate additional examples of ribbing structure and bosses that may be implemented on a lower face of a work surface. The examples shown in FIGS. 6A-8B may be incorporated into any of the above discussed work surfaces. Further, the examples shown in FIGS. 6A-8B may include any of the previously discussed features and/or aspects, and be manufactured in the same and/or similar manner using the same and/or similar materials to those previously discussed.

Figure 6A:
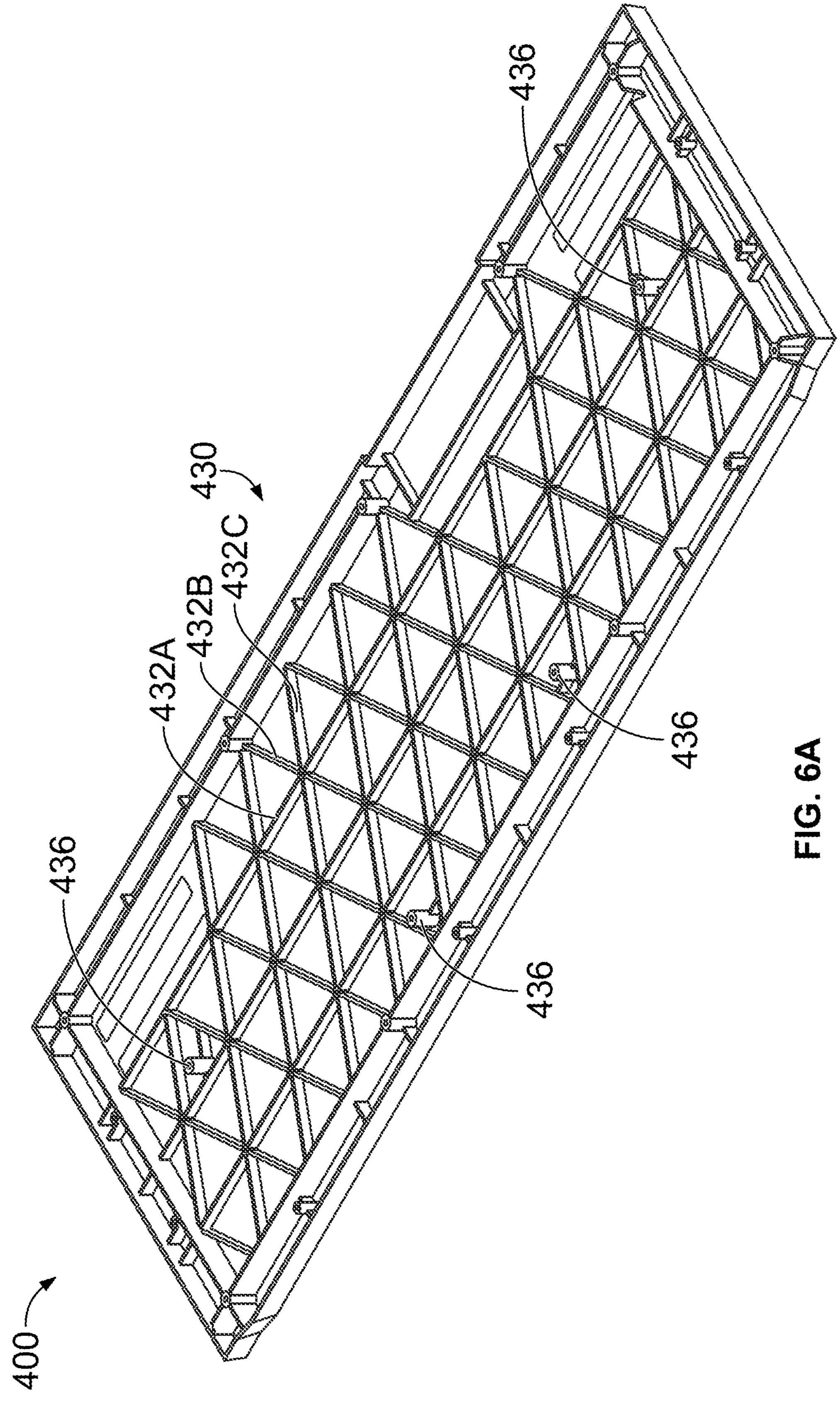
FIGS. 6A and 6B illustrate a perspective bottom view and a bottom view of a lower face of another work surface, according to an example embodiment.
Figure 6B:
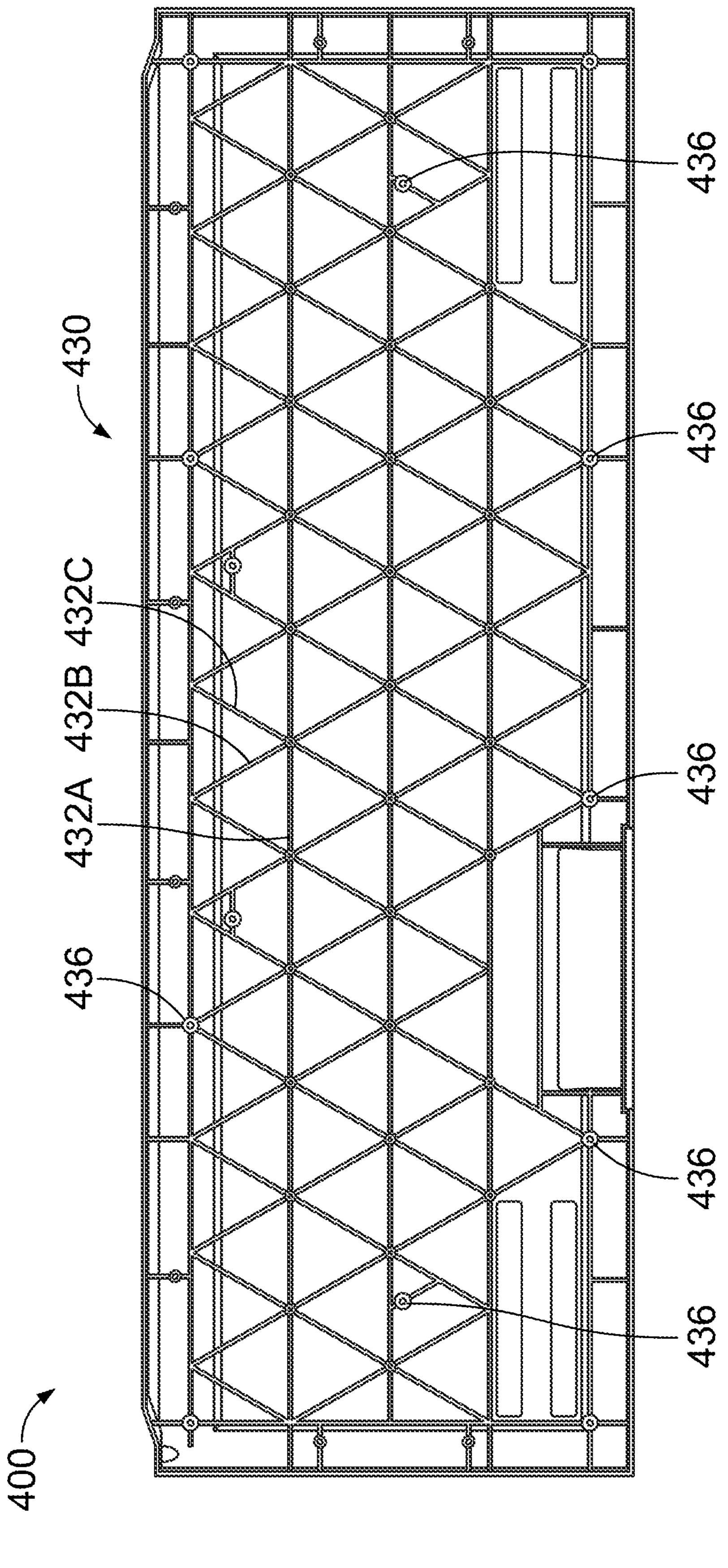

FIGS. 6A and 6B illustrate a perspective bottom view and a bottom view of a lower face 430 of a work surface 400, according to an example embodiment. As shown the lower face 430 of the work surface 400 includes a plurality of bosses 436, a first plurality of ribbing 432A, a second plurality of ribbing 432B, and a third plurality of ribbing 432C. The first, second, and third plurality of ribbing 432A-432C may intersect with one another to form an isometric grid pattern. For example, the first, second, and third plurality of ribbing 432A-432C may intersect to form a plurality of equilateral ribbing triangles on one or more portions of the lower face 430. However, in other examples a different ribbing triangle may be formed, such as an isosceles triangle. The first plurality of ribbing 432A may be aligned parallel with a side of the work surface 400, while the second and third plurality of ribbing 432B and 432C may be aligned at equal but opposing angles to the side of the work surface 400.

By forming a plurality of intersecting ribbing triangles, loading (e.g., from items placed on a top surface) may be more effectively transferred between all three sides of the ribbing and throughout the part. The plurality of intersecting ribbing triangles may thus allow for a lighter work surface 400 by reducing a material thickness required to support a desired weight. For example, any or all of the first, second, and/or third plurality of ribbing 432A-C may be made with a thinner material thickness compared to an orthogonal grid pattern, and/or a thickness of the lower surface may be reduced.

Figure 7A:
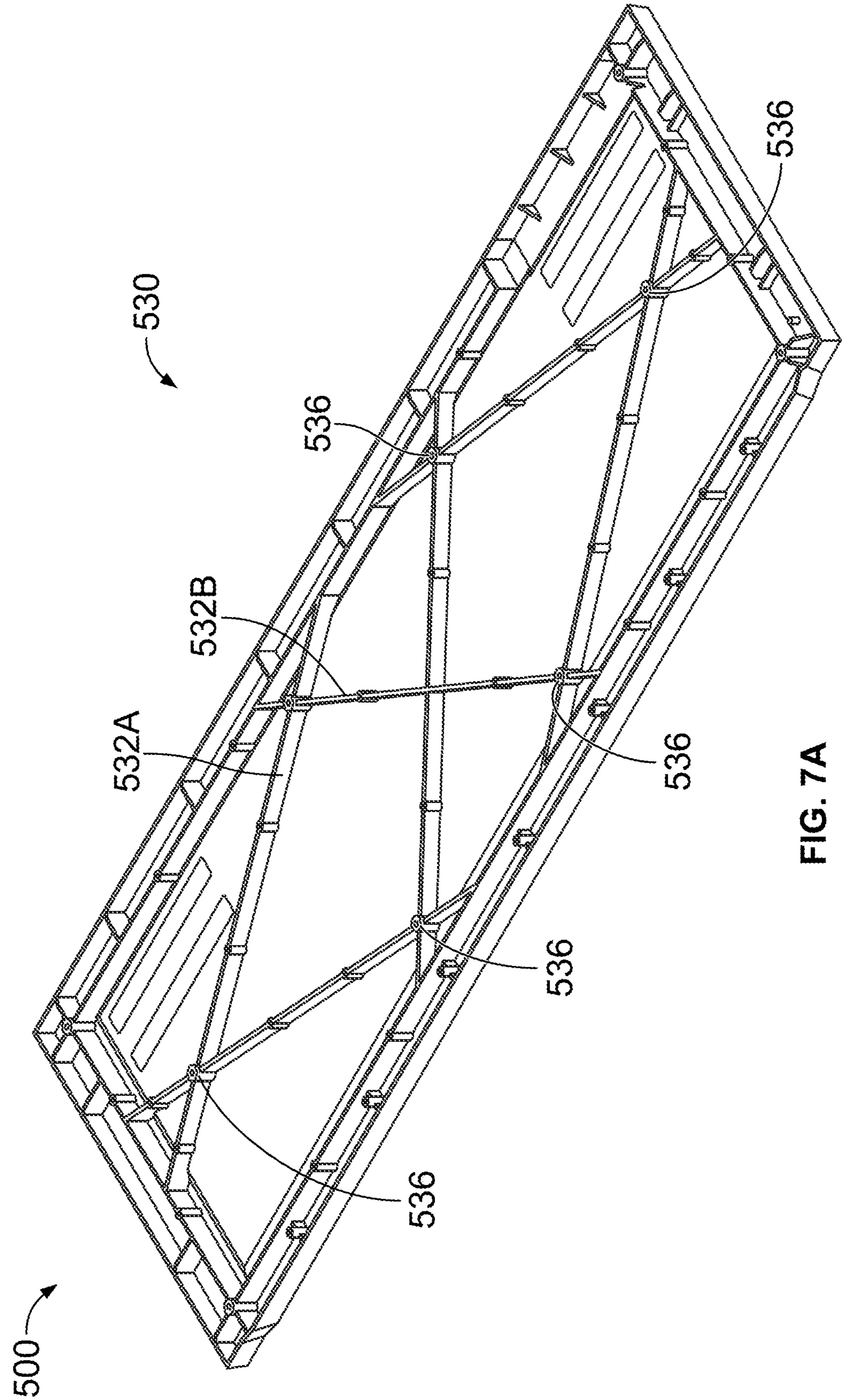
FIGS. 7A and 7B illustrate a perspective bottom view and a bottom view of a lower face of another work surface, according to an example embodiment.
Figure 7B:
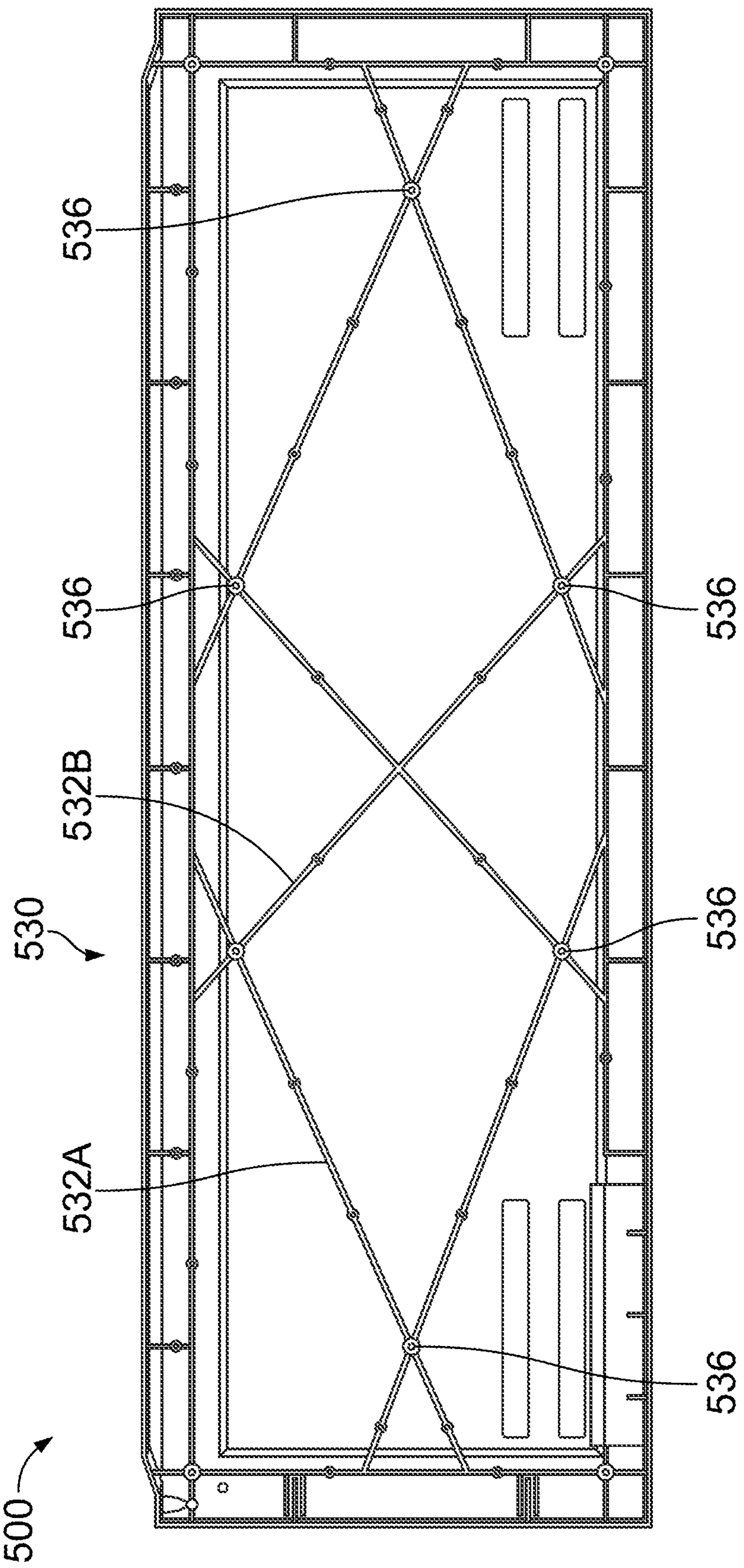

FIGS. 7A and 7B illustrate a perspective bottom view and a bottom view of a lower face 530 of a work surface 500, according to an example embodiment. As shown, the lower face 530 of the work surface 500 includes a plurality of bosses 536 where one or more of the bosses 536 are each coupled to a first rib 532A and a second rib 532B. The first rib 532A and the second rib 532B may intersect one another at multiple points along the lower face 530. Within examples, the angle formed between the intersection of the first rib 532A and the second rib 532B may be acute and/or obtuse (e.g., non-perpendicular). The placement and/or orientation of the first and second ribs 532A and 532B may be based on a location of the plurality of bosses 536, such that the first and/or second rib 532A and/or 532B may each intersect with one or more of the plurality of bosses 536.

Intersecting the first and second ribs 532A and 532B with one or more of the plurality of bosses 536 may provide structural support and rigidity to the plurality of bosses 536. This may mitigate undesirable bending and/or warping of the bosses 536 during installation and/or use. Further, the intersection of the first and second ribs 532A and 532B with or without the plurality of bosses 536 may better transfer loading throughout the lower face 530. For example, warping of the work surface 500 may be mitigated by intersecting the first and second ribs 532A and 532B at desired points along the lower face 530.

Figure 8A:
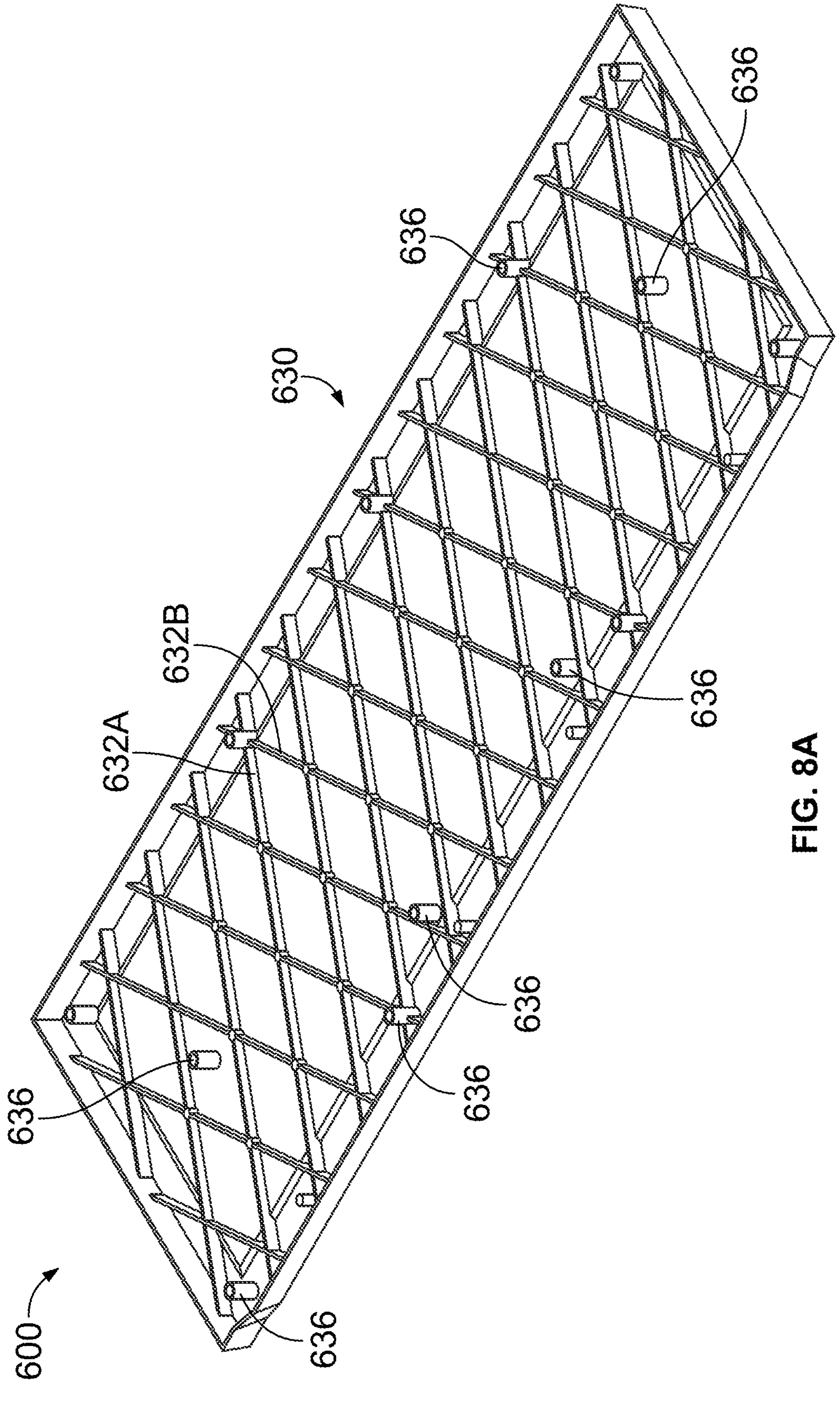
FIGS. 8A and 8B illustrate a perspective bottom view and a bottom view of a lower face of another work surface, according to an example embodiment.
Figure 8B:
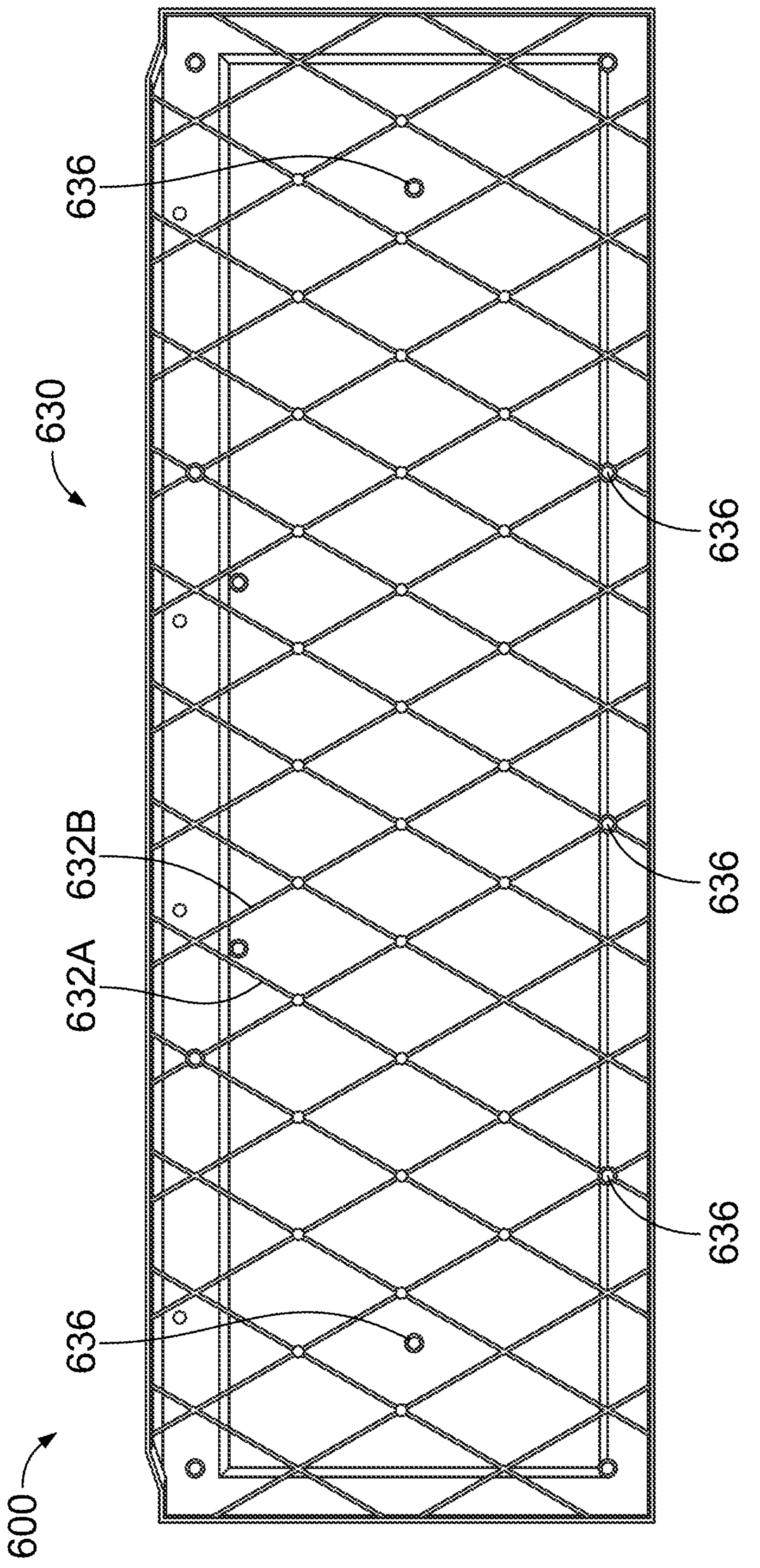

FIGS. 8A and 8B illustrate a perspective bottom view and a bottom view of a lower face 630 of a work surface 600, according to an example embodiment. As shown, the lower face 630 of the work surface 600 includes a plurality of bosses 636, a first plurality of ribbing 632A, and a second plurality of ribbing 632B. One or more of the plurality of bosses 636 may intersect with the first and/or second plurality of ribbing 632A and 632B while one or more or the plurality of bosses 636 may be freestanding on the lower face 630. The first plurality of ribbing 632A may be oriented along the lower face 630 at an angle to all sides of the work surface 600 such that the first plurality of ribbing 632A is non-parallel to any side of the work surface 600. For example, the first plurality of ribbing 632A may intersect with one or more sides of the work surface 600 to form an acute and/or obtuse angle with the respective side. The second plurality of ribbing 632B may similarly be oriented along the lower face 630 such that the second plurality of ribbing 632B is non-parallel with all sides of the work surface 600. In the example shown, the first and second plurality of ribbing 632A and 632B are oppositely oriented from one another such that the first plurality or ribbing 632A intersects with the second plurality of ribbing 632B. Thus, the first plurality of ribbing 632A may be oriented in a first direction along the lower face 630 and the second plurality of ribbing 632B may be oriented in a second direction different than the first direction.

As shown, in some examples each of the ribs in the first plurality of ribbing 632A may be parallel with one another. Similarly, each of the ribs in the second plurality of ribbing 632B may be parallel with one another. Intersection of the first and second plurality of ribbing 632A and 632B may form a non-rectangular parallelogram. For example, the first and second plurality of ribbing 632A and 632B may intersect to form a rhombus, however other parallelogram shapes are possible. In other examples, some and/or all of each of the ribs of the first and/or second plurality of ribbing structure 632A and 632B may not be parallel. By orienting the first and second plurality of ribbing 632A and 632B at non-parallel and/or non-perpendicular angles to each side of the work surface 600, the first and second plurality of ribbing 632A and 632B may traverse the lower face 630 diagonal; this may allow for each of the ribs to span more area along the lower face 630 which may reduce the total number of ribs required for either the first and/or second plurality of ribbing 632A and 632B which may reduce material weight of the work surface 600.

Figure 9A:
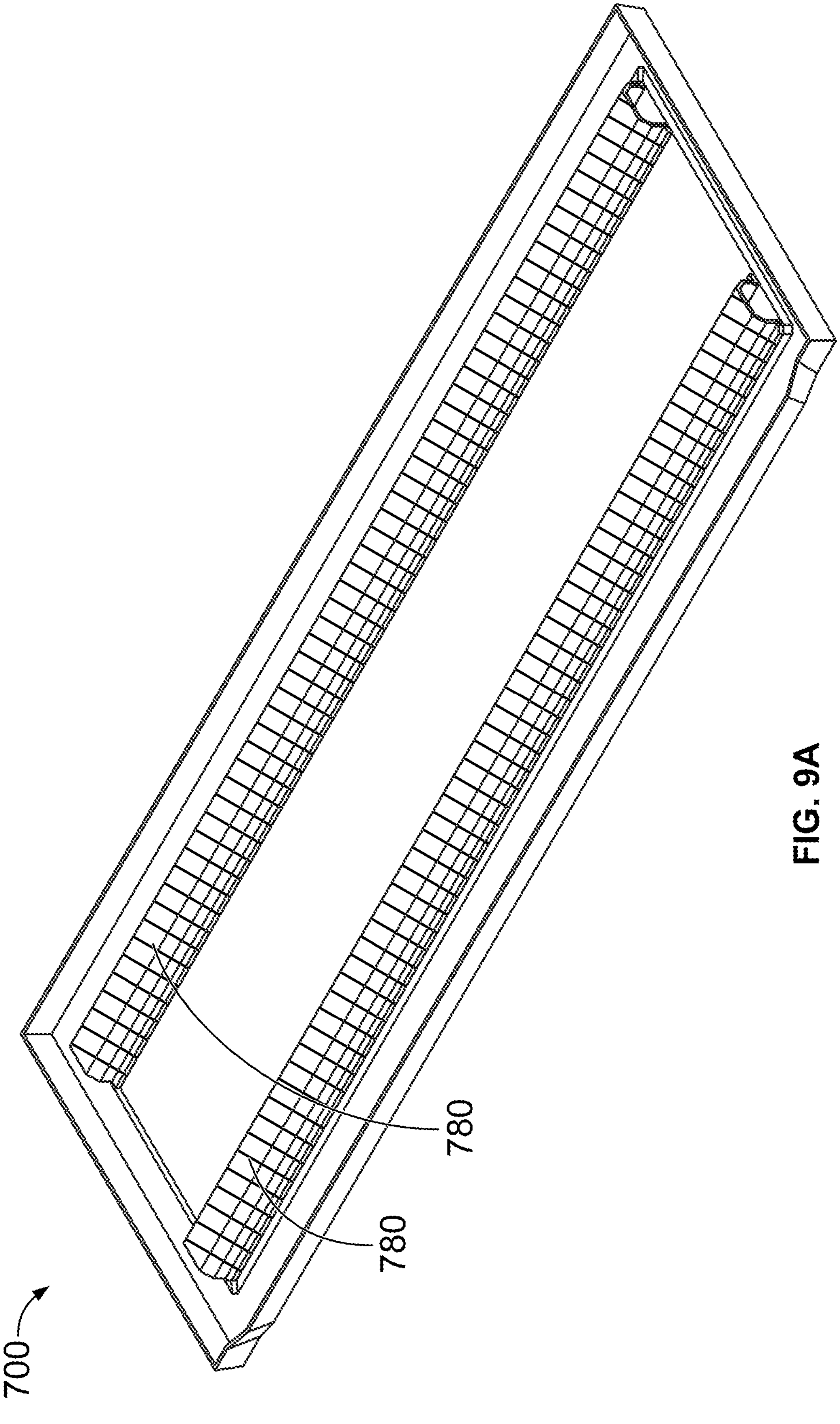
FIGS. 9A and 9B illustrate an internally disposed panel core of another work surface, according to an example embodiment.
Figure 9B:
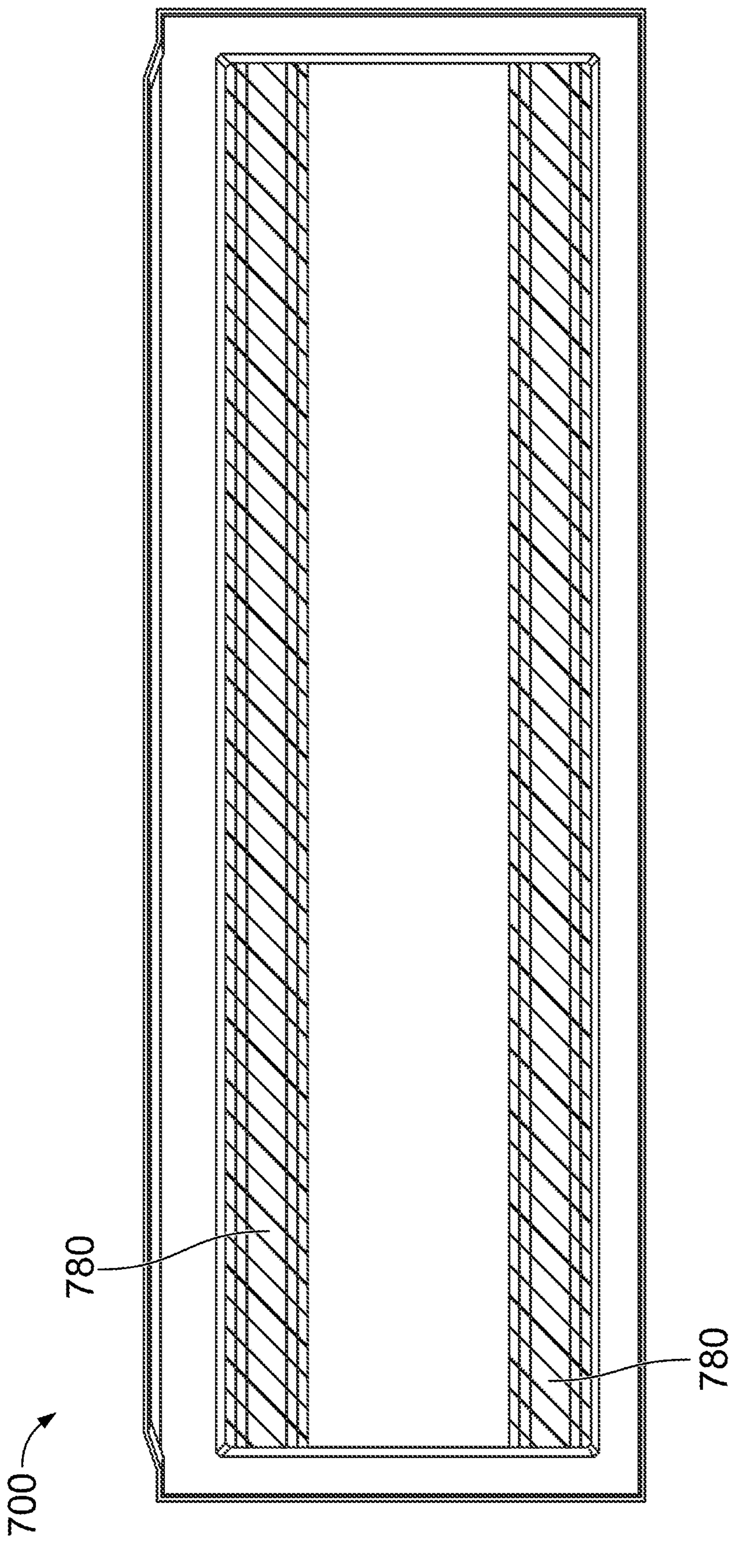

FIGS. 9A and 9B illustrate an internally disposed panel core 780 of a work surface 700, according to an example embodiment. The panel core 780 may be coupled (e.g., using adhesives and/or heat) between upper and lower faces of the work surface 700, and may provide a light weight way to add thickness and/or rigidity to the work surface 700. In some examples, the panel core 780 may be internally disposed between the upper and lower face throughout a cavity formed by the upper and lower face. However, in other examples, select portions between the upper and lower face may include the panel core 780 while another portion may not include the panel core 780. In some examples, the panel core 780 may be a honeycomb style panel, however in other examples a different material and/or design may be used. For example, the panel core 780 may be made from a metal extrusion (e.g., an aluminum extrusion), a wooden board (e.g., plywood or wooden block), and/or a fiber reinforced composite. Thus, the panel core 780 may be any structural material that is disposed between an upper and lower face of the work surface 700 resulting in a multi-piece construction of the work surface 700.

Figure 10:
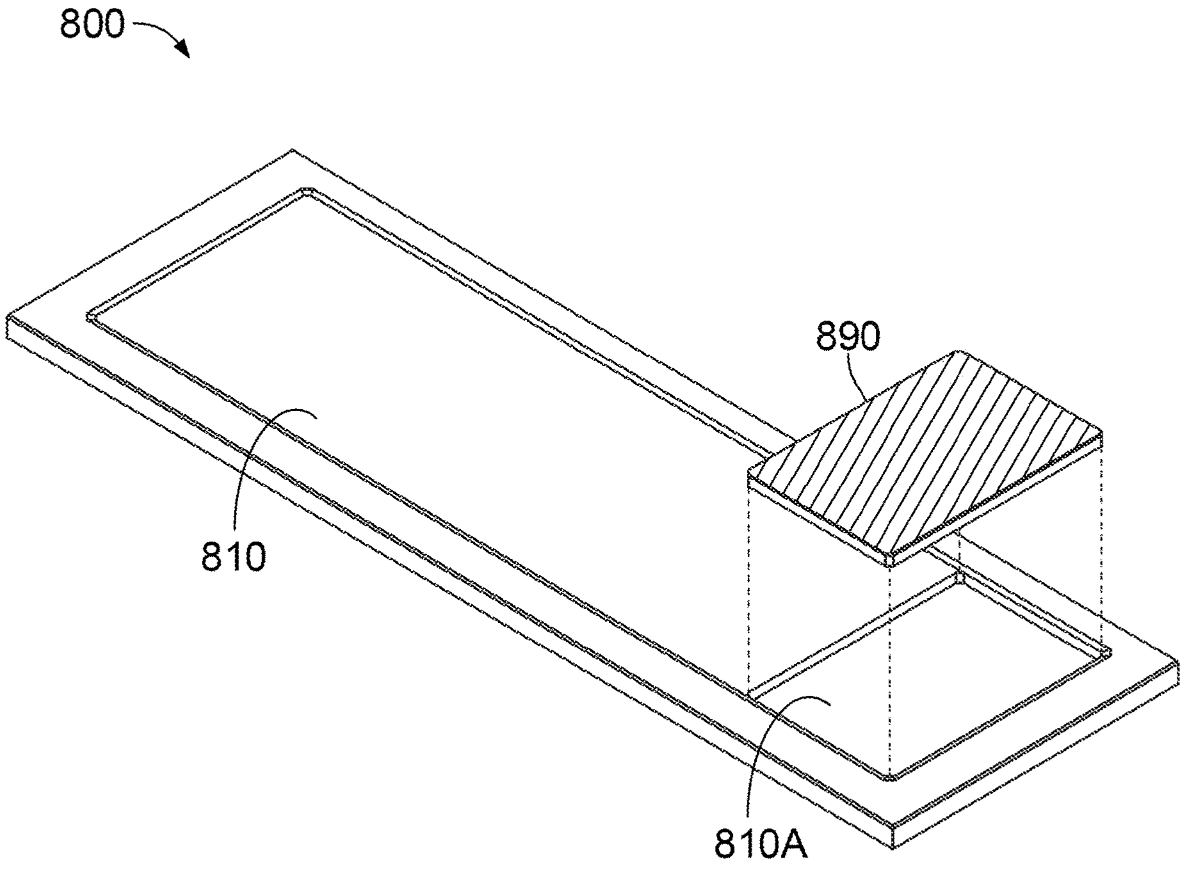
FIG. 10 illustrates a panel insert on an upper face of another work surface, according to an example embodiment.

FIG. 10 illustrates a panel insert 890 on an upper face 810 of a work surface 800, according to an example embodiment. As shown, the upper face 810 includes a cutout and/or a recessed portion 810A that receives the panel insert 890. The dimensions of the cutout and/or recessed portion 810A may allow the panel insert 890 to lie flush (e.g., substantially planar) along the upper face 810. In some examples, the upper face 810 may include more than one cutout and/or recessed portion 810A that may each receive the panel insert 890.

Within examples, the panel insert 890 may be a composite material, such as a fiber reinforced thermoset composite. Using a composite material for the panel insert 890 may provide a light weight and strong surface to be implemented on select portions of the upper face 810, while also providing heat resistance. The composite material may allow for features to be integrally formed in the panel insert 890. For example, the panel insert 890 may include one or more surface texture elements, such as a rough or patterned surface. However, in other examples, the panel insert 890 may be a substantially smooth surface that may allow the user to write on papers without interference. Multiple cutout and/or recessed portions 810A and/or multiple surface texture elements on the panel insert 890 may allow for customization and/or optimization of the upper face 810 of the work surface 800. This may allow for the work surface 800 to be tailored to specific tasks and/or work environments.

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles “a,” “an,” and “the” are used to introduce elements and/or functions of the example embodiments. The intent of using those articles is that there is one or more of the introduced elements and/or functions.

In this description, the intent of using the term “and/or” within a list of at least two elements or functions and the intent of using the terms “at least one of,” “at least one of the following,” “one or more of,” “one or more from among,” and “one or more of the following” immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a device.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A tool storage unit comprising:

a housing configured to store a tool; and a top surface coupled to the housing, wherein the top surface is a composite, the top surface comprising an upper face and a lower face disposed opposite the upper face, wherein the upper face is configured to be a work surface and includes a surface texture element, the surface texture element being integrally formed in the top surface and lying substantially planar over the upper face, wherein the upper face includes a raised portion along a perimeter of the upper face, wherein the lower face includes a lip along a portion of a perimeter of the lower face, wherein another portion of the perimeter of the lower face excludes the lip, wherein the lower face includes a plurality of ribs integrally formed with the lower face and protruding in a direction opposite the upper face, the plurality of ribs being configured to facilitate the transfer of loading from loads placed on the upper face, and being spaced at a distance so as to form a cavity, and wherein the lower face includes a plurality of integrally formed bosses, at least one of the bosses configured to be an attachment point for coupling to the housing.

2. The tool storage unit of claim 1, wherein the upper face includes a substantially planar smooth surface being integrally formed in the top surface.

3. The tool storage unit of claim 2, wherein the substantially planar smooth surface has an area of at least 60 square inches.

4. The tool storage unit of claim 1, wherein the composite is selected from a group comprising at least one of, a bulk molding compound (BMC), and a long fiber injection (LFI).

5. The tool storage unit of claim 1, wherein the composite is a fiber reinforced thermoset.

6. The tool storage unit of claim 1, wherein the top surface further comprises an illumination assembly.

7. The tool storage unit of claim 6, wherein the illumination assembly is disposed on the lower face of the top surface.

8. The tool storage unit of claim 1, wherein a threaded insert is disposed within at least one of the bosses.

9. The tool storage unit of claim 1, wherein at least one of the bosses includes an integrally formed threading.

10. The tool storage unit of claim 1, wherein the lower face further comprises a second plurality of ribs integrally formed with the lower face and protruding in the direction opposite the upper face, and wherein the second plurality of ribs are aligned parallel to an edge of the work surface.

11. The tool storage unit of claim 1, wherein the top surface is coupled to a first side of the housing and a caster is coupled to a second side of the housing opposite the first side.

12. The tool storage unit of claim 1, wherein the surface texture element is a rough surface.

13. The tool storage unit of claim 1, wherein the upper face includes a plurality of substantially planar smooth surfaces being integrally formed with the top surface, and wherein each of the plurality of planar smooth surfaces has an area of at least 60 square inches.

14. The tool storage unit of claim 1, wherein an entire perimeter of the upper face includes the raised portion.

15. The tool storage unit of claim 1, wherein the top surface further includes a panel core internally disposed between the upper face and the lower face.

16. A work surface comprising:

a top surface being a composite, the top surface comprising an upper face and a lower face disposed opposite the upper face, wherein the upper face is configured to be a work surface and includes a surface texture element, the surface texture element being integrally formed in the top surface and lying substantially planar over the upper face, wherein the upper face includes a raised portion along a perimeter of the upper face, wherein the lower face includes a lip along a portion of a perimeter of the lower face, wherein another portion of the perimeter of the lower face excludes the lip, wherein the lower face includes a plurality of ribs integrally formed with the lower face and protruding in a direction opposite the upper face, the plurality of ribs being configured to facilitate the transfer of loading from loads placed on the upper face, and being spaced at a distance so as to form a cavity, and wherein the lower face includes a plurality of integrally formed bosses, at least one of the bosses configured to be an attachment point.

17. The work surface of claim 16, wherein the upper face includes a substantially planar smooth surface being integrally formed in the top surface, and wherein the substantially planar smooth surface has an area of at least 60 square inches.

18. The work surface of claim 16, wherein the composite is selected from a group comprising at least one of a bulk molding compound (BMC), and a long fiber injection (LFI).

19. The work surface of claim 16, wherein the upper face further includes one or more non-raised portions along the perimeter of the upper face.

20. A tool storage unit comprising:

a housing configured to store a tool; and a top surface coupled to the housing, wherein the top surface is a composite, the top surface comprising an upper face and a lower face disposed opposite the upper face, wherein the upper face is configured to be a work surface and includes a surface texture element, the surface texture element being integrally formed in the top surface and lying substantially planar over the upper face, the upper face further includes a raised portion along at least a portion of a perimeter of the upper face, and the lower face includes a lip along at least a portion of a perimeter of the lower face, a plurality of ribs integrally formed with the lower face and protruding in a direction opposite the upper face, the plurality of ribs being configured to facilitate the transfer of loading from loads placed on the upper face, and being spaced at a distance so as to form a cavity, a elongate receiving cavity, configured to house an illumination assembly, extending outwardly from the lower face, the receiving cavity further having at least one wall substantially parallel to at least a portion of the lip, and a plurality of integrally formed bosses, at least one of the bosses configured to be an attachment point for coupling to the housing.

* * * * *